United States Patent
Schwab et al.

(10) Patent No.: US 12,216,387 B2
(45) Date of Patent: Feb. 4, 2025

(54) EXTERNAL RECORDING INDICATORS

(71) Applicant: Apple Inc., Cupertino, CA (US)

(72) Inventors: Justin J. Schwab, San Francisco, CA (US); Nathanael D. Parkhill, Menlo Park, CA (US); Andrew McMahon, San Carlos, CA (US); Jae Lee, Los Gatos, CA (US); Jerome Tu, Saratoga, CA (US); DK Kalinowski, San Francisco, CA (US); Nalaka Vidanagamachchi, San Jose, CA (US); Yohan Rajan, Cupertino, CA (US); Cam Harder, San Francisco, CA (US); Yoshikazu Shinohara, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/307,069

(22) Filed: Apr. 26, 2023

(65) Prior Publication Data
US 2023/0341752 A1    Oct. 26, 2023

Related U.S. Application Data

(63) Continuation of application No. 17/128,409, filed on Dec. 21, 2020, now abandoned.
(Continued)

(51) Int. Cl.
*G03B 17/18* (2021.01)
*G02B 5/00* (2006.01)
(Continued)

(52) U.S. Cl.
CPC ............. *G03B 17/18* (2013.01); *G02B 5/005* (2013.01); *G02B 27/0172* (2013.01);
(Continued)

(58) Field of Classification Search
None
See application file for complete search history.

(56) References Cited

U.S. PATENT DOCUMENTS 4,411,528 A * 10/1983 Newcomb ............ G01B 11/024
                                                    356/394
7,433,587 B2 * 10/2008 Kosaka .................. G03B 15/05
                                                    348/E5.025
(Continued)

FOREIGN PATENT DOCUMENTS

CN          207080944 U   *  3/2018
EP            2362637        8/2011
(Continued)

OTHER PUBLICATIONS

International Search report and written opinion from PCT/US2020/066552, dated Apr. 12, 2021, pp. 1-12.
(Continued)

*Primary Examiner* — Gelek W Topgyal
(74) *Attorney, Agent, or Firm* — Robert C. Kowert; Kowert, Hood, Munyon, Rankin and Goetzel, P.C.

(57) ABSTRACT

Recording indicators for devices with cameras that provide protection from tampering so that the recording indicators cannot be easily disabled or masked. Recording indicators that are external to the camera lens and that emit visible light in an encrypted pattern are described. The device may process captured frames to detect the encrypted pattern; if the encrypted pattern cannot be detected, recording is disabled. In addition, modular accessories are described that the user has to attach to the device to enable recording; the presence of the modular attachment indicates to persons in the environment that they may be being recorded.

20 Claims, 17 Drawing Sheets

Related U.S. Application Data

(60) Provisional application No. 62/953,026, filed on Dec. 23, 2019.

(51) Int. Cl.
| | |
|---|---|
| *G02B 27/01* | (2006.01) |
| *G02B 27/09* | (2006.01) |
| *G03B 30/00* | (2021.01) |
| *G11B 27/34* | (2006.01) |
| *H04N 5/765* | (2006.01) |
| *H04N 5/77* | (2006.01) |
| *H04N 23/54* | (2023.01) |
| *H04N 23/56* | (2023.01) |
| *H04N 23/57* | (2023.01) |
| *H04N 23/60* | (2023.01) |
| *H04N 23/61* | (2023.01) |
| *H04N 23/80* | (2023.01) |
| *G02B 13/00* | (2006.01) |
| *H04N 23/63* | (2023.01) |

(52) U.S. Cl.
CPC .......... *G02B 27/095* (2013.01); *G03B 30/00* (2021.01); *G11B 27/34* (2013.01); *H04N 5/765* (2013.01); *H04N 5/77* (2013.01); *H04N 5/772* (2013.01); *H04N 23/54* (2023.01); *H04N 23/56* (2023.01); *H04N 23/57* (2023.01); *H04N 23/60* (2023.01); *H04N 23/61* (2023.01); *H04N 23/80* (2023.01); *G02B 13/004* (2013.01); *G02B 2027/0138* (2013.01); *H04N 23/634* (2023.01)

(56) References Cited

U.S. PATENT DOCUMENTS

| | | | |
|---|---|---|---|
| 7,922,329 B1* | 4/2011 | Graether | A61B 3/135 |
| | | | 351/205 |
| 9,955,286 B2 | 4/2018 | Segal | |
| 10,168,778 B2 | 1/2019 | Kazanksy et al. | |
| 10,354,146 B1 | 7/2019 | Vasiri | |
| 11,442,342 B2 | 9/2022 | Schwab et al. | |
| 2001/0010760 A1* | 8/2001 | Saito | G03B 15/05 |
| | | | 396/16 |
| 2003/0043287 A1 | 3/2003 | Kakiuchi et al. | |
| 2006/0104621 A1* | 5/2006 | Nakata | H04N 23/672 |
| | | | 348/E5.045 |
| 2007/0103552 A1* | 5/2007 | Patel | H04N 5/913 |
| | | | 348/203 |
| 2008/0190255 A1 | 8/2008 | McCracken et al. | |
| 2008/0198255 A1 | 8/2008 | Kirihara et al. | |
| 2010/0008501 A1* | 1/2010 | Iwasaki | H04N 23/56 |
| | | | 380/201 |
| 2011/0170849 A1* | 7/2011 | Chang | H04N 23/45 |
| | | | 396/322 |
| 2011/0199533 A1* | 8/2011 | Drader | H04N 23/651 |
| | | | 348/E5.045 |
| 2011/0211807 A1* | 9/2011 | Drader | H04N 23/56 |
| | | | 386/232 |
| 2014/0334676 A1* | 11/2014 | Skans | G06T 7/292 |
| | | | 382/103 |
| 2015/0157194 A1 | 6/2015 | Okuda et al. | |
| 2016/0305871 A1* | 10/2016 | Gerst, III | G01N 21/8806 |
| 2018/0088687 A1 | 3/2018 | Hanover | |
| 2018/0091729 A1 | 3/2018 | Hanover | |
| 2018/0160020 A1* | 6/2018 | Djakovic | H04N 23/55 |
| 2018/0232899 A1* | 8/2018 | Lansel | H04N 23/56 |
| 2018/0274997 A1* | 9/2018 | Shang | G01L 1/241 |
| 2019/0068768 A1* | 2/2019 | Garg | H04M 1/04 |
| 2019/0199907 A1* | 6/2019 | Daulton | H04N 23/631 |
| 2019/0206917 A1* | 7/2019 | Nakajiki | G02B 5/201 |
| 2019/0268518 A1* | 8/2019 | Howard | F21V 17/108 |
| 2019/0306391 A1* | 10/2019 | Von Cramon | H04N 23/56 |
| 2020/0012095 A1 | 1/2020 | Edwin | |
| 2020/0143534 A1* | 5/2020 | Wright | G06T 7/0012 |
| 2021/0181597 A1* | 6/2021 | Moon | G03B 11/041 |
| 2021/0191133 A1 | 6/2021 | Schwab et al. | |
| 2021/0203827 A1* | 7/2021 | Frevert | H04N 23/71 |
| 2021/0349366 A1* | 11/2021 | Chen | H04N 23/57 |
| 2021/0357626 A1* | 11/2021 | Floerkemeier | G06K 7/1443 |
| 2023/0156314 A1 | 5/2023 | Sztuk | |

FOREIGN PATENT DOCUMENTS

| | | | | |
|---|---|---|---|---|
| EP | 2362637 A1 * | 8/2011 | .......... | H04N 5/2256 |
| JP | 2007295152 | 11/2007 | | |

OTHER PUBLICATIONS

International Search report and Written Opinion from PCT/US2020-066552, dated Jun. 11, 2021, pp. 1-21.
U.S. Appl. No. 18/192,579, filed Mar. 29, 2023, Arhtur Y. Zhang.

* cited by examiner

EXTERNAL RECORDING INDICATORS

PRIORITY INFORMATION

This application is a continuation of U.S. patent application Ser. No. 17/128,409, filed Dec. 21, 2020, which claims benefit of priority of U.S. Provisional Application Ser. No. 62/953,026 entitled "RECORDING INDICATORS" filed Dec. 23, 2019, which are hereby incorporated by reference herein in their entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) combines computer generated information (referred to as virtual content) with real world images or a real world view to augment, or add content to, a user's view of the world. The simulated environments of VR and/or the mixed environments of MR may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and apparatus for providing recording indicators in devices with cameras are described. A device (e.g., a mobile, handheld device or head-mounted device) may include one or more cameras that may be used to capture still images or video frames of the user's environment. In at least some devices, the device may include recording functionality that allows the user to record images or video of the real environment captured by the camera(s). Various embodiments of recording indicators for devices that provide protection from tampering so that the recording indicators cannot be easily disabled or masked are described.

Embodiments of recording indicators that are external to a device's camera are described. These embodiments may include one or more light sources (e.g., LED lights) arranged around the camera lens that may emit visible light in an encrypted pattern. The LEDs may be arranged closely around the camera lens, which may make it difficult to block the LEDs using, for example, tape. In addition, the emitted light pattern may be reflected off one or more objects or surfaces in the environment and captured by the camera. A device controller may process captured frames to detect the encrypted pattern. If the encrypted pattern cannot be detected (e.g., because the user has blocked or disabled the LEDs), the controller may disable recording of video captured by the camera. The device controller may also implement image processing methods to remove or reduce the encrypted pattern from captured frames prior to recording or further processing the frames.

In addition to using external visible light recording indicators as described above as tamper-resistant recording indicator solutions for a device's video cameras, embodiments of modular solutions for providing indications that a user may be recording with a device's camera are described. In some embodiments, a modular accessory that contains the entire recording functionality for a device may be provided. To record video, the user has to attach the accessory to the device. Alternatively, in some embodiments, a modular "key" may be provided that the user has to attach to the device to enable recording with an integrated camera. In both cases, the presence of the modular attachment would indicate to persons in the environment that they may be being recorded. Note that external visible light recording indicators as described above may be used in combination with either of the modular solutions.

Figure 1:
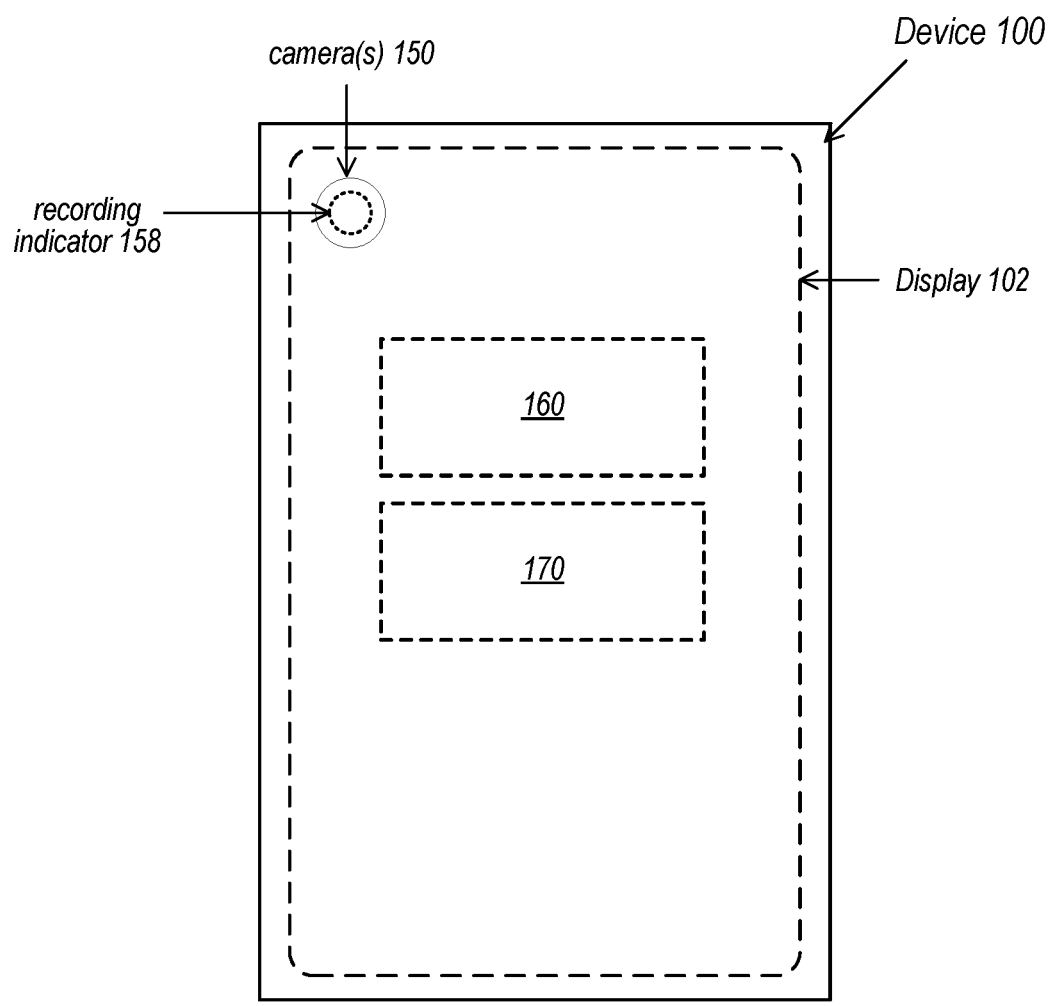
FIG. 1 illustrates an example device including a camera that may implement a recording indicator, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Figure 9A:
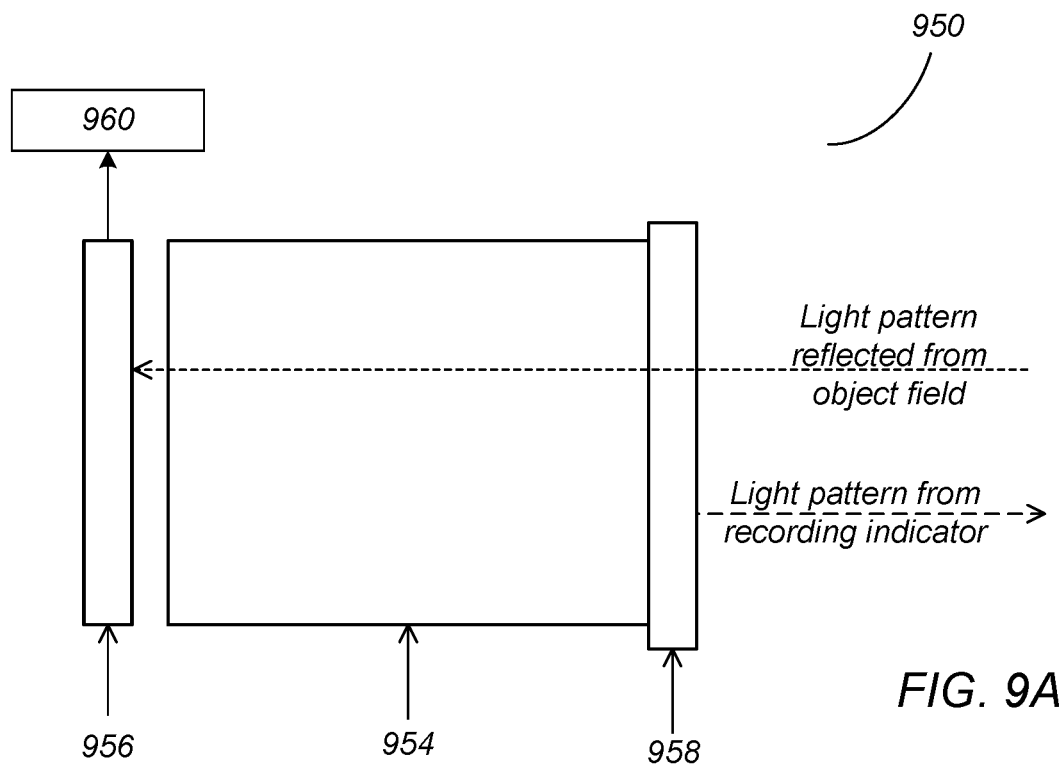
FIGS. 9A and 9B illustrate a recording indicator that includes a ring of light elements around the camera lens that generate light pulses in an encrypted pattern, according to some embodiments.
Figure 9B:
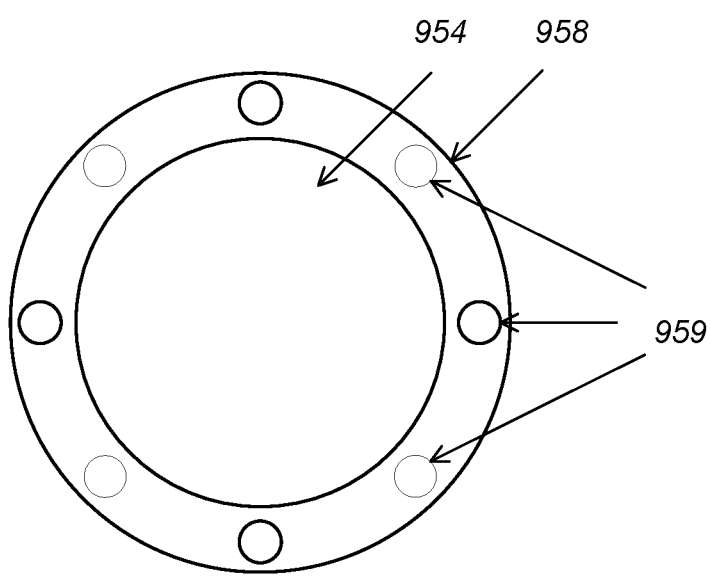
Figure 11:
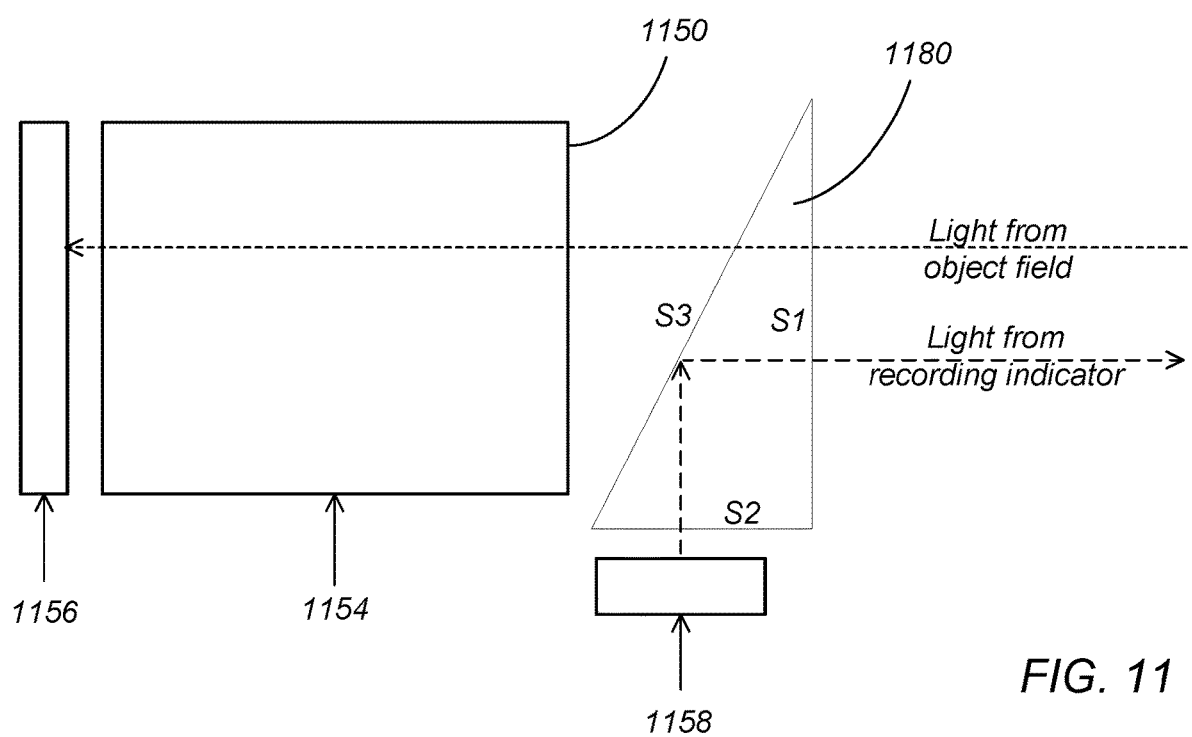
FIG. 11 illustrates a recording indicator that includes a prism in front of the camera lens, according to some embodiments.
Figure 14:
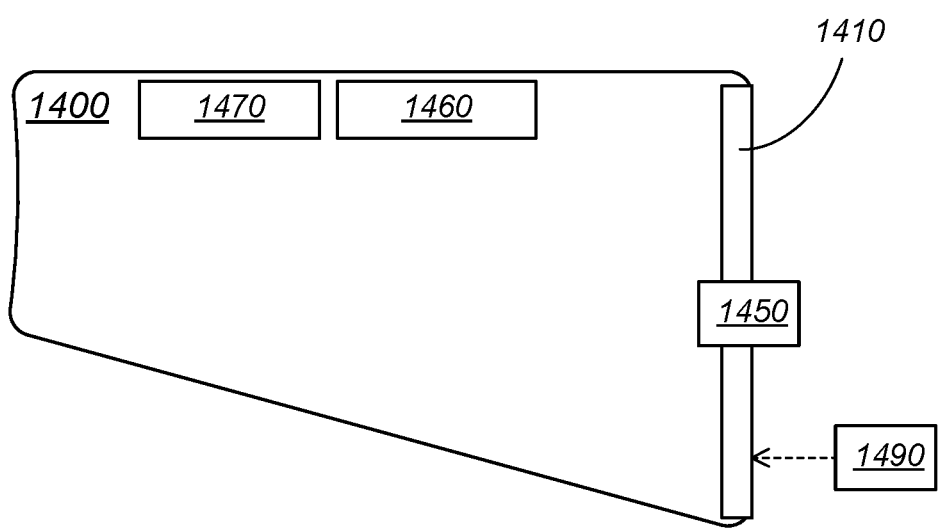
FIG. 14 illustrates a modular accessory for an HMD that acts as a "key" to enable recording functionality for the HMD camera, according to some embodiments.

Various embodiments of methods and apparatus for providing recording indicators in devices are described. Embodiments of the recording indicator methods and apparatus described herein may, for example, be applied to cameras in mobile, handheld devices such as smartphones and tablet or pad devices. FIG. 1 illustrates an example handheld device including a camera that may implement a recording indicator, according to some embodiments. Device 100 may, for example, be a smartphone or a tablet or pad device. Device 100 may include a display screen 102 on one side (referred to as the front), and one or more cameras 150 on the opposite side (referred to as the back). FIG. 1 shows a view of the back of the device 100. Note, however, that device may also include one or more cameras on the front side. In some embodiments, the camera 150 may include recording indicator 158 technology as illustrated in FIGS. 2A-2C and FIGS. 4-7 in which LEDs integrated in the camera 150 emit visible light through the camera lens aperture to provide visible light that effectively covers the field of view of the camera. In some embodiments, the camera 150 may include recording indicator 158 technology as illustrated in FIGS. 9A-9B in which LEDs arranged around the camera 150 lens emit visible light in an encrypted pattern. In some embodiments, the camera 150 may include recording indicator 158 technology as illustrated in FIG. 11 in which an optical element (e.g., a prism) is located in front of the lens barrel of the camera 150. In some embodiments, a modular "key" as illustrated in FIG. 14 may have to be attached to the device 100 to enable recording by the camera 150.

The device 100 may include a controller 160 that may include one or more of various types of processors, image signal processors (ISPs), graphics processing units (GPUs), coder/decoders (codecs), system on a chip (SOC), CPUs, and/or other components for processing and rendering video and/or images. Controller 160 may, for example, render frames based at least in part on inputs obtained from the camera(s) 150, and ma, for example, provide the frames to display screen 102.

The device 100 may include memory 170 that may, for example, be used to record video or images captured by the one or more cameras 150. Memory 170 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Various embodiments of recording indicators for devices including but not limited to mobile, handheld devices as illustrated in FIG. 1 that provide protection from tampering so that the recording indicators cannot be easily disabled or masked are described.

Embodiments of recording indicators that are integrated in a device's camera and that emit visible light through the camera lens aperture are described. The recording indicators include light sources (e.g., LED lights) that emit light through the camera lens in time periods between frame capture (integration) periods. Since the recording indicators are integrated in the camera, they cannot easily be mechanically disabled. In addition, since the recording indicators emit light through the camera lens, taping over the indicator would prevent the camera from recording.

Embodiments of recording indicators that are external to a device's camera are also described. These embodiments may include one or more light sources (e.g., LED lights) arranged around the camera lens that may emit visible light in an encrypted pattern. The LEDs may be arranged closely around the camera lens, which may make it difficult to block the LEDs using, for example, tape. In addition, the emitted light pattern may be reflected off one or more objects or surfaces in the environment and captured by the camera. A device controller may process captured frames to detect the encrypted pattern. If the encrypted pattern cannot be detected (e.g., because the user has blocked or disabled the LEDs), the controller may disable recording of video captured by the camera. The device controller may also implement methods to remove or reduce the encrypted pattern from captured frames prior to recording or further processing the frames.

In addition to using internal or external visible light recording indicators as described above as tamper-resistant recording indicator solutions for video cameras in devices, embodiments of modular solutions for providing indications that a user may be recording with a device's camera are described. In some embodiments, a modular accessory that contains the entire recording functionality for a device may be provided. To record video, the user has to attach the accessory to the device. Alternatively, in some embodiments, a modular "key" may be provided that the user has to attach to the device to enable recording with an integrated camera. In both cases, the presence of the modular attachment would indicate to persons in the environment that they may be being recorded. Note that internal or external visible light recording indicators as described above may be used in combination with either of the modular solutions.

Embodiments of the recording indicator methods and apparatus described herein may be applied to cameras in various devices and systems, including but not limited to cameras in smartphones, tablet or pad devices, cameras in HMDs, handheld video cameras, cameras in cell phones, cameras in laptop or desktop computer systems, and surveillance video cameras.

Figure 2A:
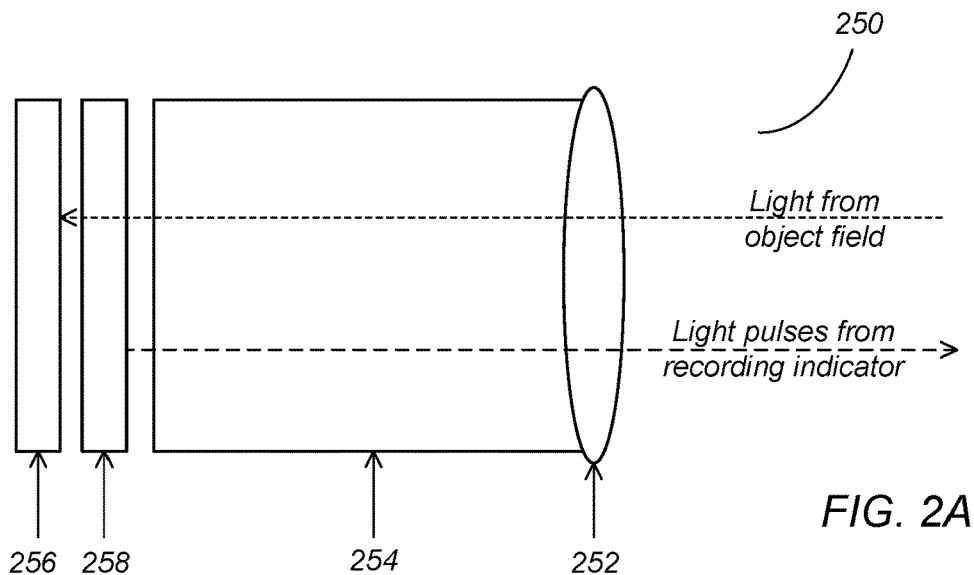
FIGS. 2A through 2C illustrate recording indicator components and methods in a camera, according to some embodiments.
Figure 2B:
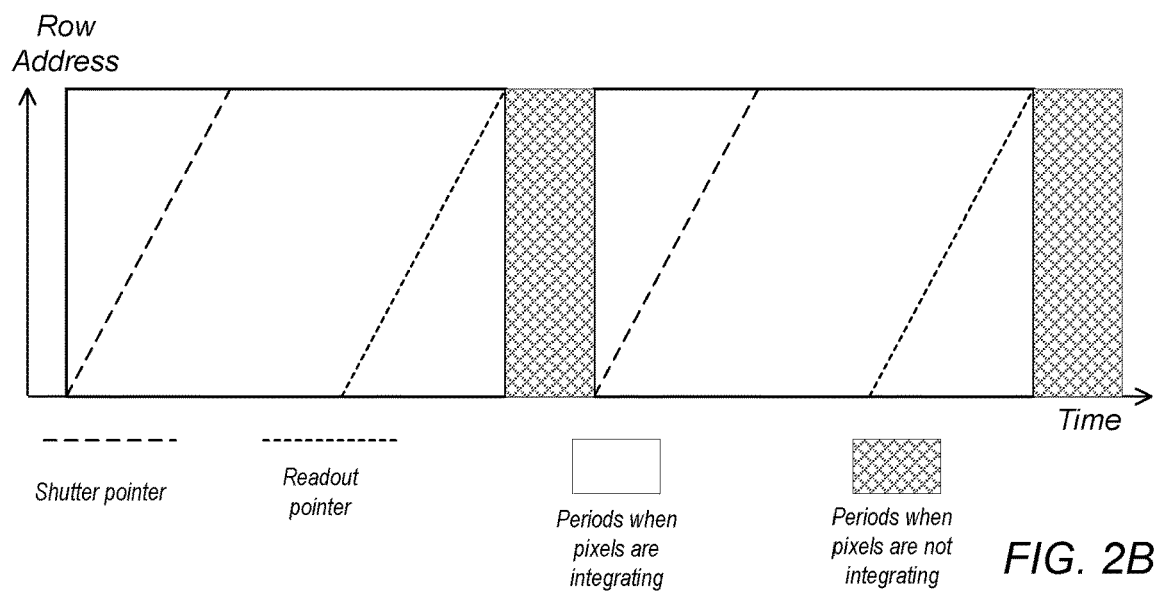
Figure 2C:
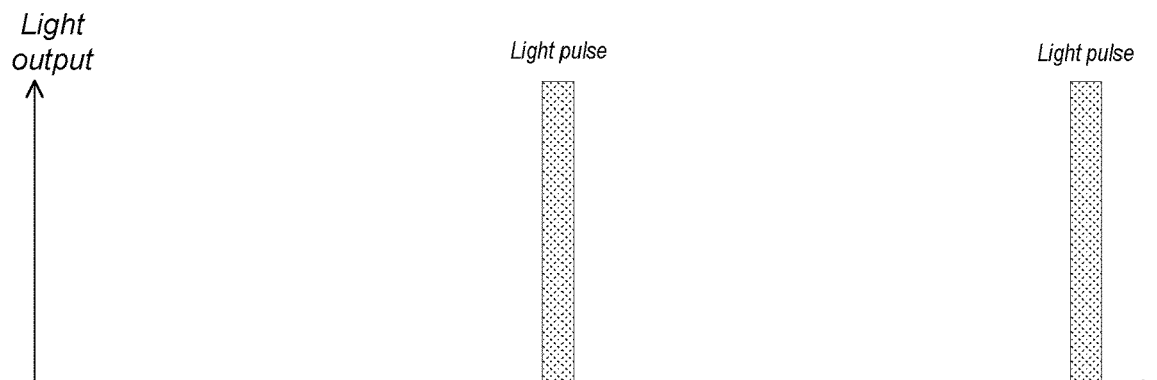

FIGS. 2A through 2C illustrate recording indicator components and methods for emitting light through the camera lens aperture, according to some embodiments.

FIG. 2A is a block diagram illustrating the components of an example camera 250, according to some embodiments. The camera 250 includes, but is not limited to, a lens barrel 254 that includes, but is not limited to, one or more refractive lens elements and at least one aperture stop. The camera 250 also includes an image sensor 256 configured to integrate pixels during integration periods. Element 252 illustrates the "aperture" of the camera 250 that may be visible to persons in front of the camera 250, and may also correspond to the field of view of the camera 250. A recording indicator 258 is integrated in the camera 250. The recording indicator 258 may include, but is not limited to, one or more light sources (e.g., LED lights) that emit light pulses through the camera aperture 252 in time periods between frame capture (integration) periods. Since the recording indicator 258 emits light pulses through the same aperture 252 that is used to capture images, the recording indicator 258 may be visible to any persons that are in the field of view of the camera. Since the recording indicator 258 is integrated in the camera 250, it cannot easily be mechanically disabled. In addition, since the recording indicator 258 emits light through the same aperture 252 that is used to capture images, taping over the indicator 258 would prevent the camera 250 from recording. Note that the camera 250 may operate to capture frames for processing by a device controller while not recording video, in which case the recording indicator 258 may be disabled.

FIGS. 2B and 2C graphically illustrate a recording indicator 258 that emits pulses of lights during non-integration periods. FIG. 2B graphically shows periods when pixels are being integrated by the camera's 250 image sensor 256. The camera 250 may be configured so that there are brief periods between frame captures when pixels are not being integrated, as shown in FIG. 2B. For example, the camera 250 may capture frames at a frame rate of 30 or 60 frames per second. Relatively short non-integration periods between frame captures may be provided in which the recording indicator 258 emits pulses of light through the camera aperture 252 as shown in FIG. 2C. Emitting pulses of light during the non-integration periods as shown in FIGS. 2B and 2C may prevent the light emitted by the recording indicator 258 from interfering with the light captured during the integration periods.

The recording indicator 258 may be implemented in any of various ways. FIGS. 3 through 7 illustrate several example embodiments of recording indicators that emit pulses of light through the camera lens aperture during non-integration time periods as illustrated in FIGS. 2A through 2C.

Figure 3:
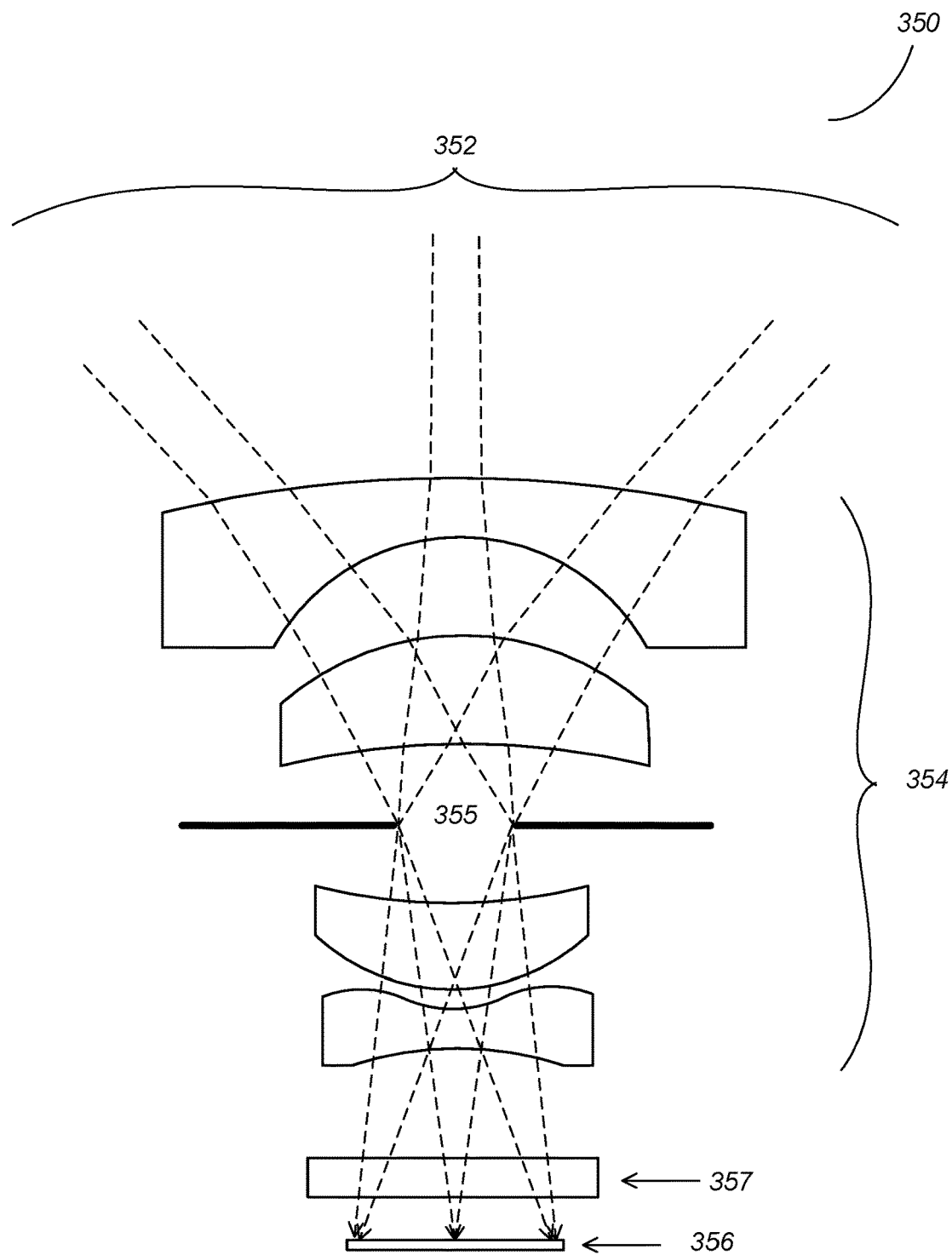
FIG. 3 illustrates an example camera, according to some embodiments.

FIG. 3 shows an example camera 350 that includes, but is not limited to, a lens barrel 354, an image sensor 356, and an optional element 357 (e.g., an infrared (IR) filter) located between the lens barrel 354 and the image sensor 356. The lens barrel 354 may include, but is not limited to, one or more refractive lens elements (in this example four lens elements) and an aperture stop 355 located within the lens barrel. Note that the number and shape of the lens elements are provided as examples, and are not intended to be limiting. The lens elements in the lens barrel 354 refract light received from a field of view 352 in front of the camera 350 through aperture stop 355 to form an image at an image plane at or near a surface of the image sensor 356. The image sensor 356 may be configured to capture frames during integration periods as illustrated in FIG. 2B.

Figure 4:
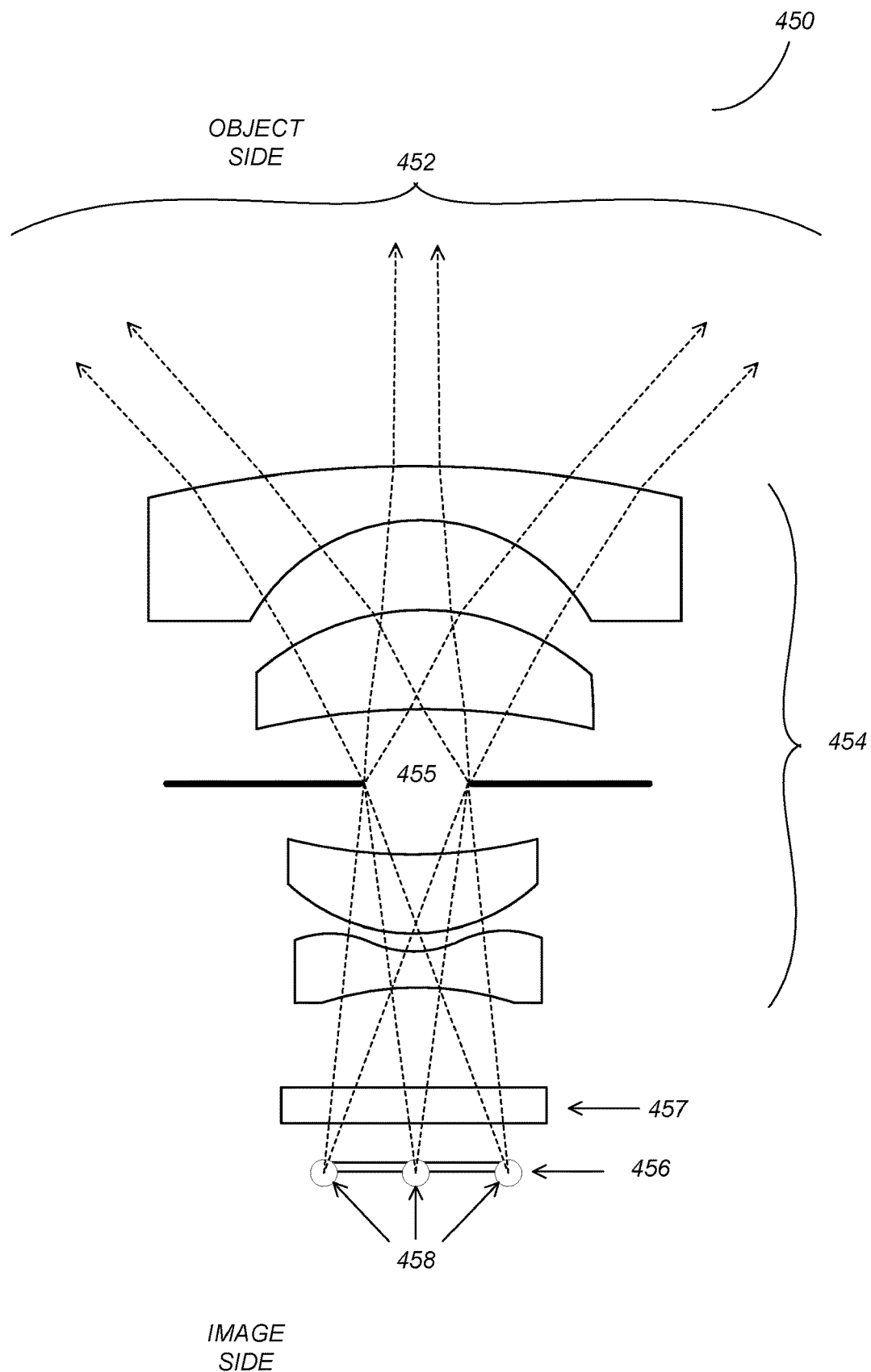
FIG. 4 illustrates an example camera as illustrated in FIG. 3 that includes a recording indicator located at or near the image sensor, according to some embodiments.

FIG. 4 shows an example camera 450 as illustrated in FIG. 3 that includes a recording indicator 458 located at or near the image sensor 456. For example, the recording indicator 458 may include two or more light sources (e.g., LEDs) arranged around the periphery of the image sensor 456. The recording indicator 458 may be configured to emit light pulses during non-integration periods as illustrated in FIGS. 2B and 2C. The lens elements in the lens barrel 454 refract the emitted light through aperture 455 to provide visible light that effectively covers the field of view 452 of the camera 450.

Figure 5:
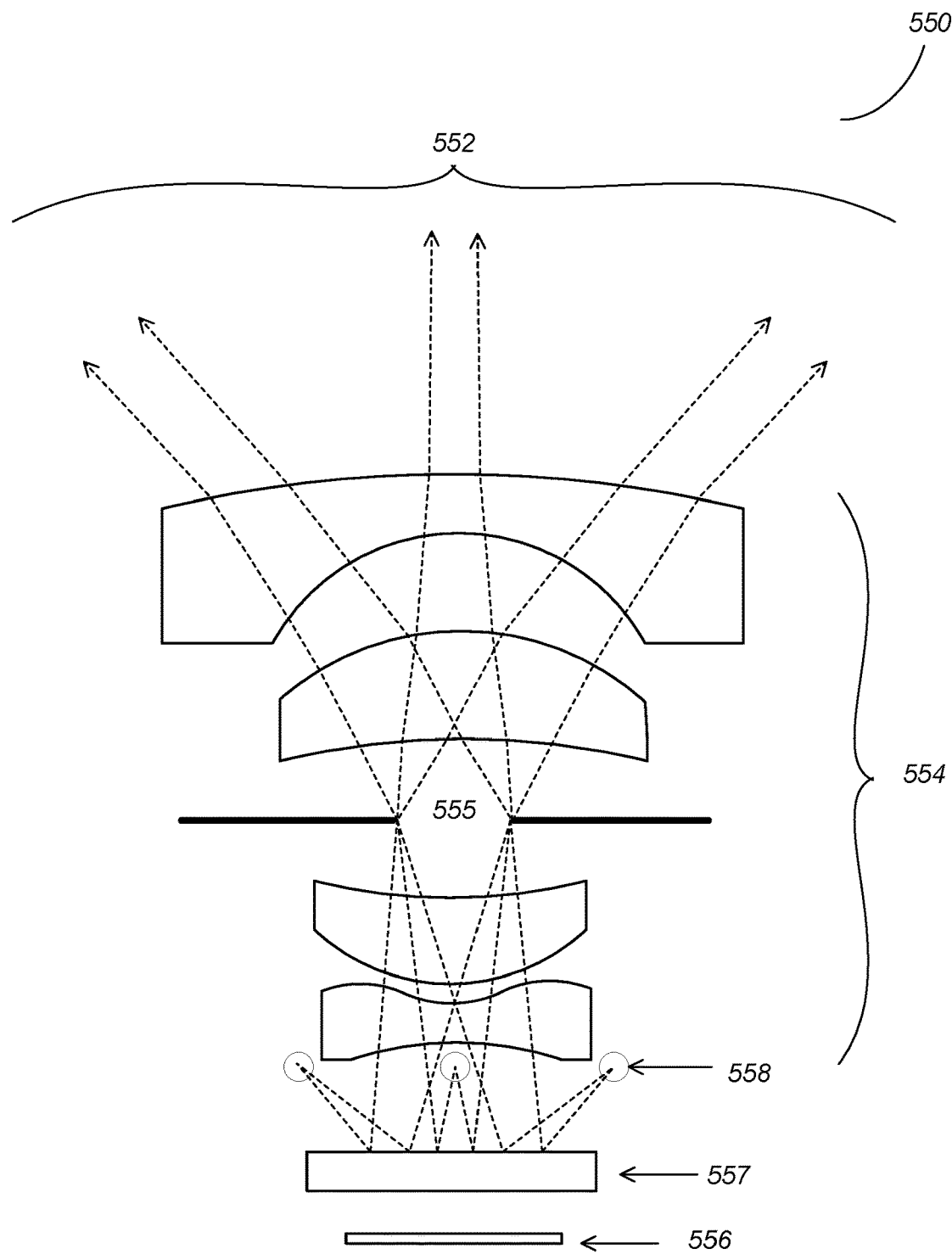
FIG. 5 illustrates an example camera as illustrated in FIG. 3 that includes a recording indicator located between an image side of the lens barrel and the image sensor, according to some embodiments.

FIG. 5 shows an example camera 550 as illustrated in FIG. 3 that includes a recording indicator 558 located between an image side of the lens barrel and the image sensor 556. The camera 550 may, but does not necessarily include, an optional element 557 located between the lens barrel and the image sensor 556. Element 557 may, for example, be an IR filter or some other type of filter, a polarizer, a cover glass located on or near the object side surface of the image sensor 556. For example, the recording indicator 558 may include two or more light sources (e.g., LEDs) arranged around the periphery of the image side of the last lens element in the lens barrel. The recording indicator 558 may be configured to emit light pulses towards the image sensor 556 during non-integration periods as illustrated in FIGS. 2B and 2C. If an optional element 557 is present, the light pulses may be reflected off the surface of the element 557 towards the lens barrel 554. Alternatively, if an optional element 557 is not present, the light pulses may be reflected off the surface of the sensor 556. The lens elements in the lens barrel 554 refract the reflected light through aperture 555 to provide visible light that effectively covers the field of view 552 of the camera 550.

Figure 6:
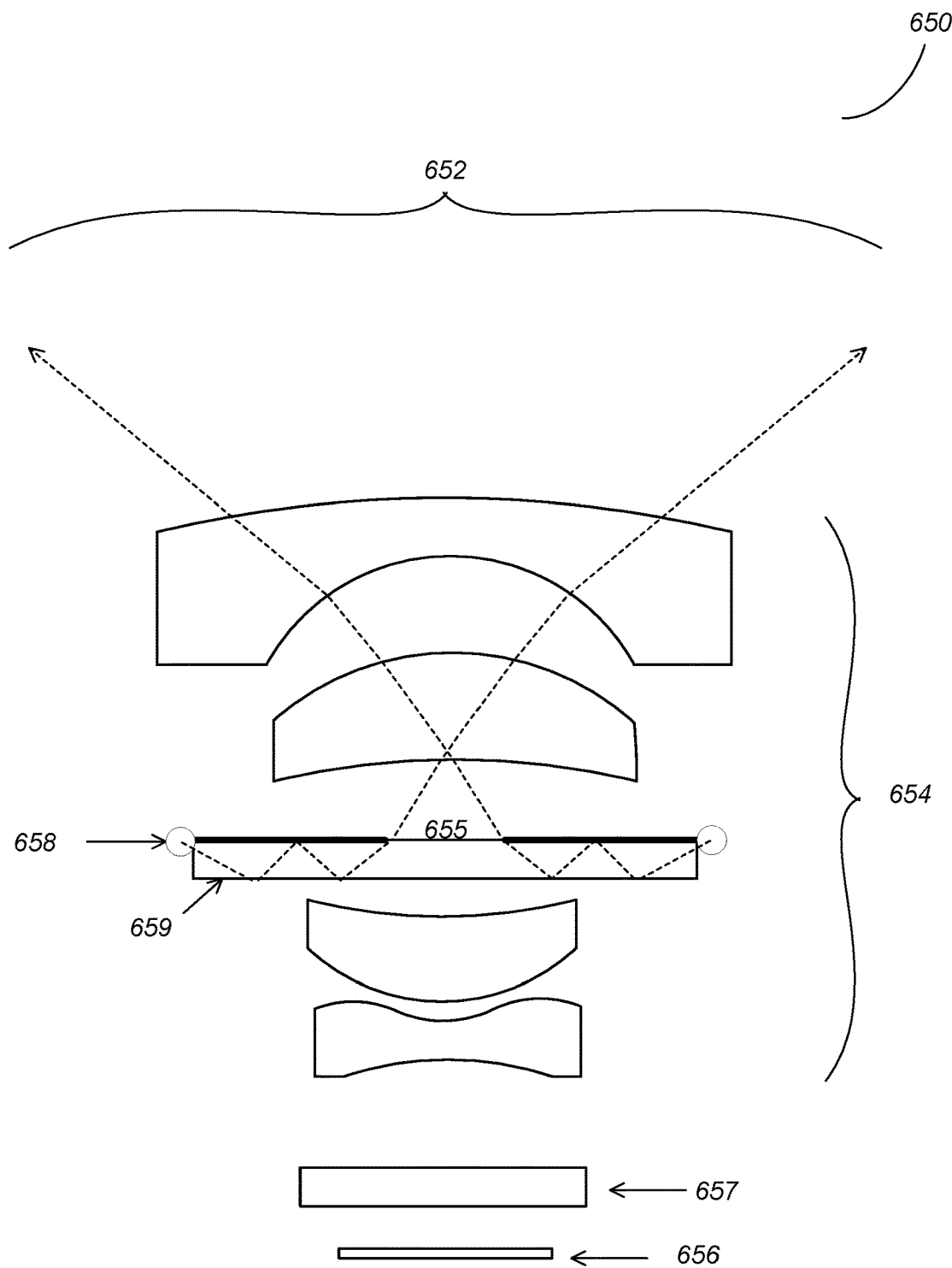
FIG. 6 illustrates an example camera as illustrated in FIG. 3 that includes a recording indicator located at an image side of a camera aperture stop, according to some embodiments.

FIG. 6 shows an example camera 650 as illustrated in FIG. 3 that includes a recording indicator 658 located at the image side of the camera aperture stop 655. For example, the recording indicator 658 may include two or more light sources (e.g., LEDs) arranged around the outer edge of a glass or plastic element 659 (e.g., a glass or plastic plate) located at the image side of the camera aperture stop 655. The LEDs of the recording indicator 658 may be configured to emit light pulses into the outer edge of element 659 during non-integration periods as illustrated in FIGS. 2B and 2C. The light pulses may be reflected one or more times off the surfaces of the element 659 towards the aperture stop 655, for example via total internal reflection (TIR) of the surfaces, before exiting element 659 at the aperture stop 655. Alternatively, element 659 may be a holographic element or waveguide through which the light emitted by the LEDs is "guided" from the outer edge of the element 659 to exit at the aperture stop 655. The t 650.

Figure 7:
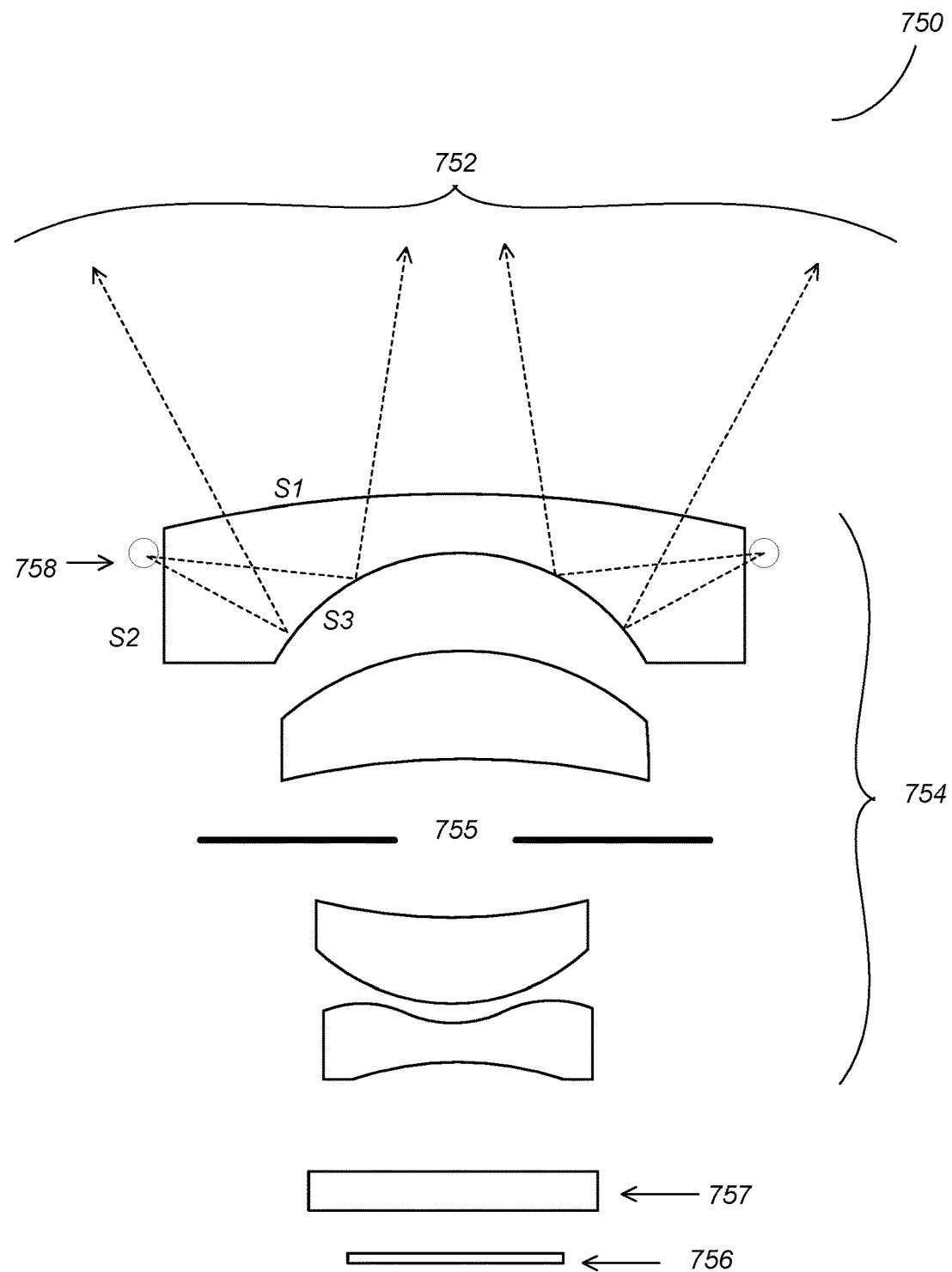
FIG. 7 shows an example camera as illustrated in FIG. 3 that includes a recording indicator located in the lens barrel on the object side of the camera aperture stop, for example at the first (objective) lens in the lens barrel, according to some embodiments.

FIG. 7 shows an example camera 750 as illustrated in FIG. 3 that includes a recording indicator 758 located in the lens barrel 754 on the object side of the camera aperture stop 755, for example at the first (objective) lens in the lens barrel 754. For example, the recording indicator 758 may include two or more light sources (e.g., LEDs) arranged around the outer edge or flange of the first (objective) lens in the lens barrel 754. The LEDs of the recording indicator 758 may be configured to emit light pulses into the outer edge or flange of the lens (S2) during non-integration periods as illustrated in FIGS. 2B and 2C. The light pulses may be reflected off the inner (image side) surface of the lens (S3), for example via total internal reflection (TIR) of the image side surface, and then exit the lens through the outer (object side) surface of the lens (S1) to provide visible light that effectively covers the field of view 752 of the camera 750.

Figure 8:
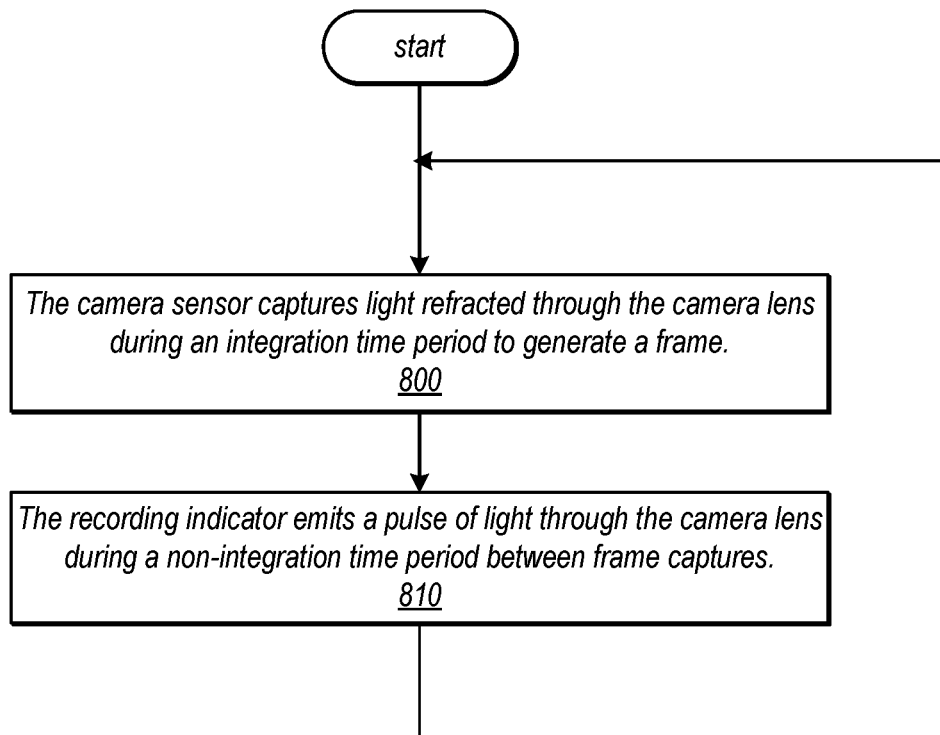
FIG. 8 is a flowchart of a method for providing a recording indicator in a device as illustrated in FIGS. 2A through 7, according to some embodiments.

FIG. 8 is a high-level flowchart of a method for providing a recording indicator in a device as illustrated in FIGS. 2A through 7, according to some embodiments. As indicated at 800, the camera's image sensor captures light refracted through the camera lens during an integration time period to generate a frame. As indicated at 810, the recording indicator emits a pulse of light through the camera lens during a non-integration time period between frame captures to provide an indication that the camera is recording that effectively covers the field of view of the camera. As indicated by the arrow returning to element 800, this process continues as long as the camera is capturing and recording video. Note that the camera may still operate to capture frames for processing by a device controller while not recording video, in which case the recording indicator may be disabled.

Figure 10:
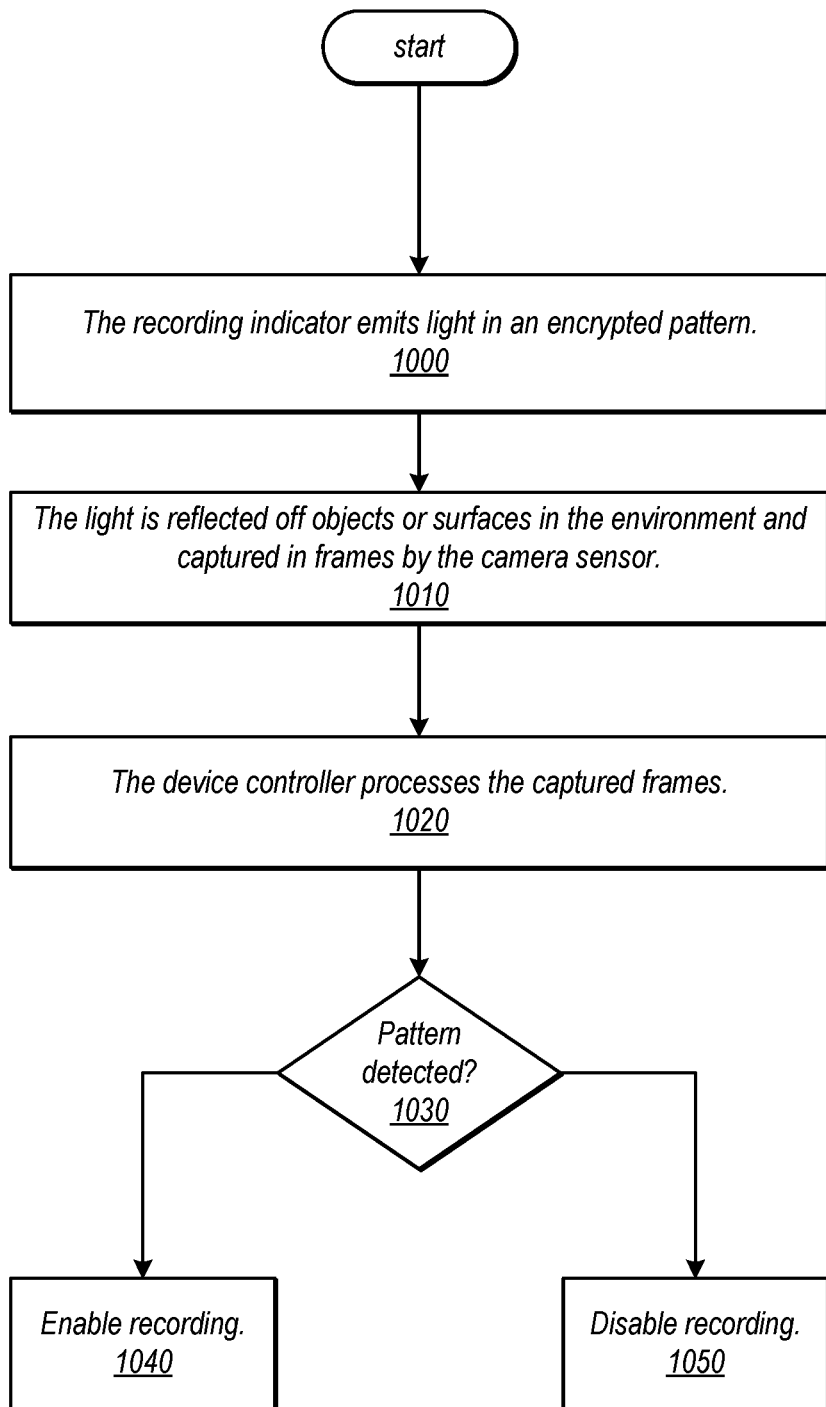
FIG. 10 is a flowchart of a method for providing a recording indicator in a device as illustrated in FIGS. 9A and 9B, according to some embodiments.

FIGS. 9A, 9B, and 10 illustrate embodiments of recording indicators that are external to a device's camera.

FIGS. 9A and 9B illustrate a recording indicator 958 that includes a ring of light elements 959 around the camera lens 954 that generate light pulses in an encrypted pattern, according to some embodiments. As shown in FIG. 9A, the light emitted by recording indicator 958 may provide an indication that the camera 950 is recording that effectively covers the field of view of the camera 950. The light elements 959 (e.g., LEDs) may be arranged closely around the camera lens 954 as shown in FIG. 9B, which may make it difficult to block the LEDs using, for example, tape. In addition, the emitted light pattern may be reflected off one or more objects or surfaces in the environment and captured by the camera 950. Instead or in addition to reflected light from the environment, at least some light from the light elements 959 may go directly back into the camera lens 954 A device controller 960 may process captured frames to detect the encrypted pattern. If the encrypted pattern cannot be detected (e.g., because the user has blocked or disabled the LEDs), the controller 960 may disable recording of video captured by the camera 950. The device controller 960 may also implement methods to remove or reduce the encrypted pattern from captured frames prior to recording or further processing the frames.

FIG. 10 is a flowchart of a method for providing a recording indicator in a device as illustrated in FIGS. 9A and 9B, according to some embodiments. As indicated at 1000, the recording indicator emits pulses of light in an encrypted pattern. As indicated at 1010, the light pattern is reflected off objects or surfaces in the environment and captured in frames by the camera's image sensor. As indicated at 1020, a device controller processes one or more of the captured frames to look for the encrypted pattern. At 1030, if the pattern is detected, recording mode may be enabled for the camera as indicated at 1040. Otherwise, recording mode may be disabled as indicated at 1050. Note that the camera may still operate to capture frames for processing by the device controller while recording mode is disabled, and the controller may continue to process video frames captured by the camera to detect the encrypted pattern formed by the light emitted from the recording indicator captured by the image sensor when recording mode is enabled and when recording mode is disabled.

In some embodiments, the encrypted pattern may be randomly selected each time recording is initiated by the user to prevent "spoofing" of the pattern by the user.

While not shown in FIG. 10, the device controller may also implement methods to remove or reduce the encrypted pattern from captured frames prior to recording or further processing the frames.

FIG. 11 illustrates a recording indicator that includes a prism in front of the camera lens, according to some embodiments. A camera 1150 may include, but is not limited to, a lens barrel 1154 and an image sensor 1156. An optical element 1180 (e.g., a prism) may be located in front of the lens barrel 1154. Surface S1 of element 1180 faces the object field in front of the camera 1150. Surface S2 of element 1180 faces the lens barrel 1154. A recording indicator 1158 (e.g., one or more LEDs) may be located at a surface S2 of element 1180. Light from the object field passes through surfaces S1 and S3 of element 1180 and into lens barrel 1154. Recording indicator 1158 emits pulses of light through surface S2 of element 1180; the light from recording indicator 1158 is then reflected off surface S3 of element 1180 (e.g., via total internal reflection (TIR) at surface S3) and exits through surface S1 of element 1180 to provide visible light that effectively covers the field of view of the camera 1150.

The recording indicator system as indicated in FIG. 11 may be configured to emit pulses of light during non-integration periods as shown in FIGS. 2B and 2C, or alternatively may emit pulses during integration periods. In the second case, the camera and/or controller may be configured to filter out light emitted by the recording indicator that is captured by the camera.

Recording Indicators in CGR Systems

In addition to applications in mobile handheld devices as illustrated in FIG. 1, embodiments of recording indicators as described herein may also be applied in computer-generated reality (CGR) systems. A CGR system may include a wearable device such as a headset, helmet, goggles, or glasses (referred to herein as a head-mounted device (HMD)). An HMD may implement any of various types of display technologies. For example, an HMD may include a near-eye display system that displays left and right images on opaque display screens in front of the user's eyes that are viewed by the user. As another example, rather than an opaque display, an HMD may have a transparent or translucent display through which the user may view the real environment and a medium through which light representative of images is directed to a person's eyes to provide an augmented view of reality to the user.

An HMD may also include one or more cameras that may be used to capture still images or video frames of the user's environment. Video frames captured by the camera(s) may, for example, be processed by a controller of the HMD and used to provide an augmented view of the real environment to the user via the display system. In at least some systems, the HMD may include recording functionality that allows the user to record images or video of the real environment captured by the HMD camera(s).

Conventional video recording systems (e.g., conventional handheld video cameras) may include indicators (e.g., red or green LED lights) that are turned on when the cameras are recording video, and turned off when the cameras are not recording video. These recording indicators signal to persons in the environment that the video recording system is (or is not) recording video of the environment in front of the camera. However, these conventional recording indicators may be easily defeated, for example by mechanically disabling the light or by simply placing a piece of opaque tape over the light. For hand-held devices like conventional handheld video cameras, smartphones, and tablet or pad devices, the physical act of recording with these devices in itself may indicate to persons that they are (or may be) being recorded. However, HMDs are worn on a user's head, and thus there is no clear physical motion that would indicate whether or not the user may be currently recording video. Thus, there is a need for recording indicators for HMDs that cannot be easily defeated so that persons can be aware that they are being recorded.

Figure 12:
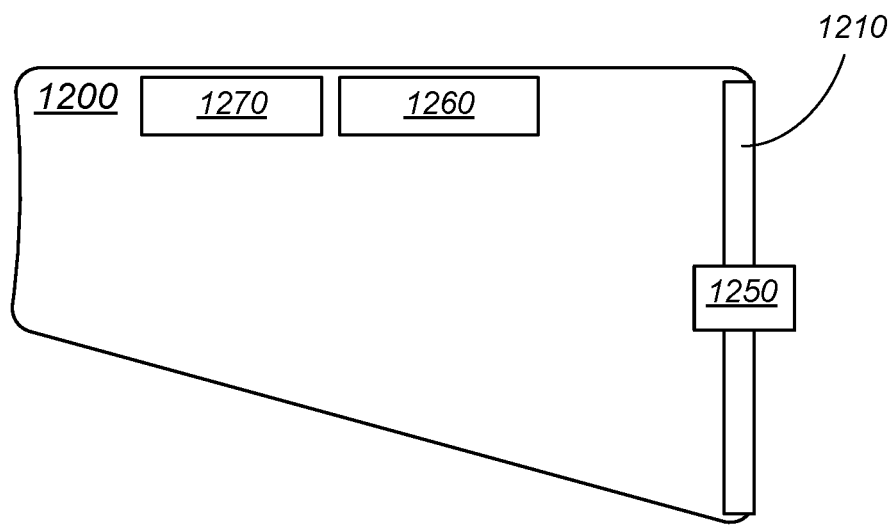
FIG. 12 illustrates an example head-mounted device (HMD), according to some embodiments.

FIG. 12 illustrates an example head-mounted device (HMD), according to some embodiments. Note that HMD 1200 as illustrated in FIG. 12 is given by way of example, and is not intended to be limiting. In various embodiments, the shape, size, and other features of an HMD 1200 may differ, and the locations, numbers, types, and other features of the components of an HMD 1200 may vary.

HMD 1200 may implement any of various types of display technologies. For example, HMD 1200 may include a near-eye display system that displays left and right images on screens in front of the users eyes that are viewed by a subject, such as DLP (digital light processing), LCD (liquid crystal display) and LCoS (liquid crystal on silicon) technology display systems. As another example, HMD 1200 may include a direct retinal projector system that scans left and right images, pixel by pixel, to the subject's eyes. To scan the images, left and right projectors generate beams that are directed to left and right display screens (e.g., ellipsoid mirrors) located in front of the users eyes; the display screens reflect the beams to the user's eyes. To create a three-dimensional (3D) effect, virtual content at different depths or distances are shifted left or right in the two images as a function of the triangulation of distance, with nearer objects shifted more than more distant objects.

HMD 1200 may include a display 1210, mounted in a wearable housing or frame. As shown in FIG. 12, HMD 200 may be worn on a user's head so that the display 1210 (e.g. screens and optics of a near-eye display system, or reflective components (e.g., ellipsoid mirrors) of a direct retinal projector system) are disposed in front of the user's eyes. In embodiments that include a near-eye display system, the HMD 1200 may also include and two optical lenses (eyepieces); the user looks through the eyepieces onto the display 1210.

HMD 1200 may also include one or more sensors that collect information about the user's environment (video, depth information, lighting information, etc.) and about the user (e.g., eye or gaze tracking sensors). The sensors may include one or more of, but are not limited to one or more eye tracking cameras (e.g., infrared (IR) cameras) that capture views of the user's eyes, one or more cameras 1250 (e.g., RGB video cameras) that capture images of the real world environment in a field of view in front of the user, and one or more ambient light sensors that capture lighting information for the environment.

A controller 1260 for the system may be implemented in the HMD 1200, or alternatively may be implemented at least in part by an external device (e.g., a computing system) that is communicatively coupled to HMD 1200 via a wired or wireless interface. Controller 1260 may include one or more of various types of processors, image signal processors (ISPs), graphics processing units (GPUs), coder/decoders (codecs), system on a chip (SOC), CPUs, and/or other components for processing and rendering video and/or images. Controller 1260 may render frames (each frame including a left and right image) that include virtual content based at least in part on inputs obtained from the sensors, and may provide the frames to display 1210.

Memory 1270 for the system may be implemented in the HMD 1200, or alternatively may be implemented at least in part by an external device (e.g., a computing system) that is communicatively coupled to HMD 1200 via a wired or wireless interface. The memory 1270 may, for example, be used to record video or images captured by the one or more cameras 1250. Memory 1270 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Figure 15A:
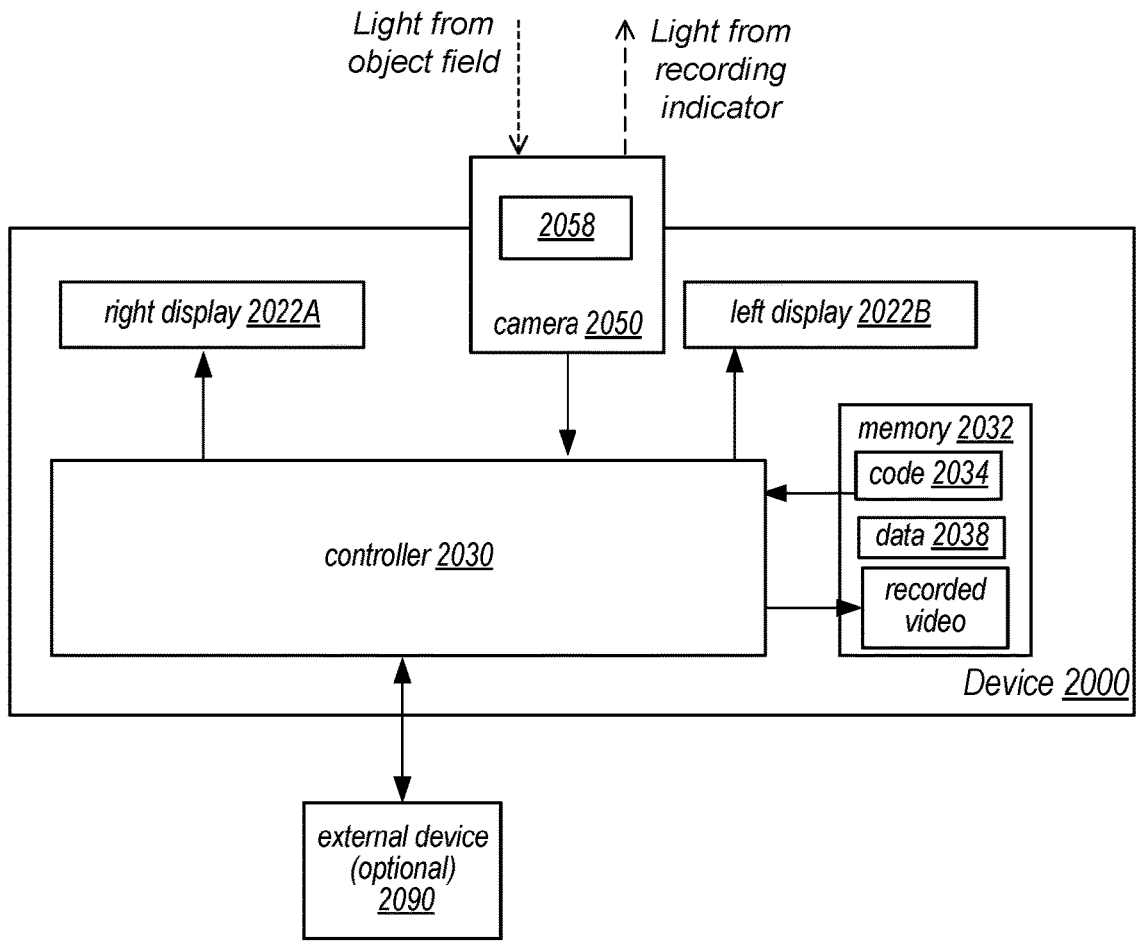
FIGS. 15A through 15C are block diagrams illustrating example systems that may include components and implement methods for providing recording indicators as illustrated in FIGS. 2 through 14 in a device, according to some embodiments.
Figure 15B:
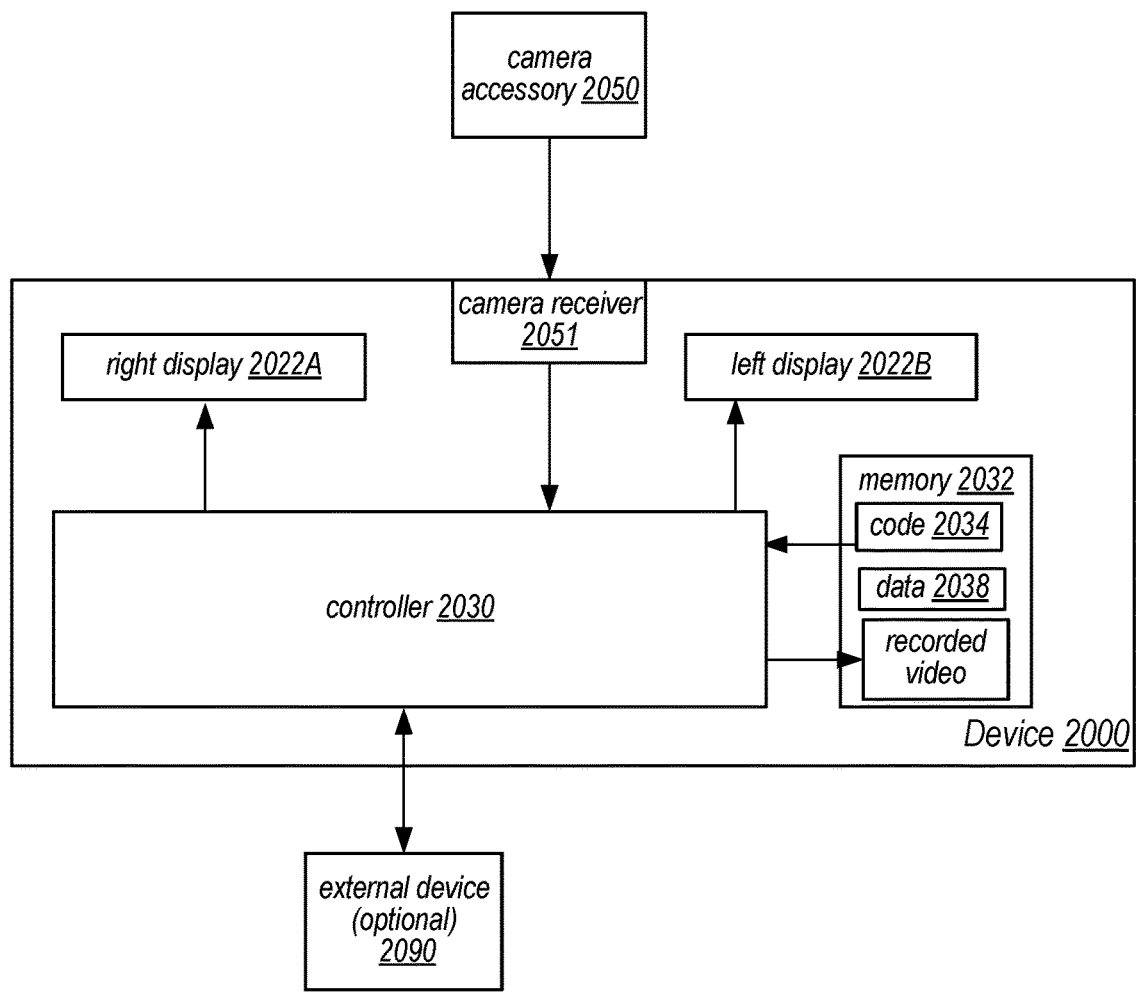
Figure 15C:
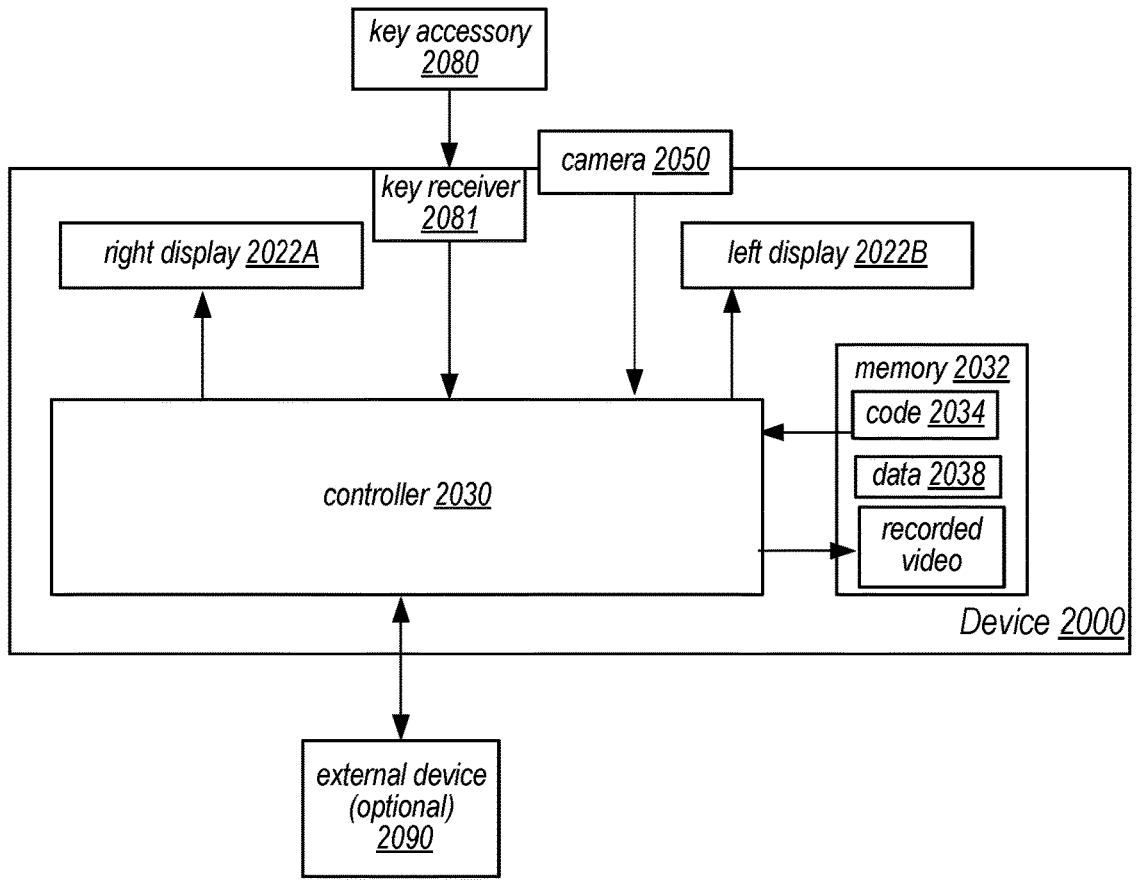

FIGS. 15A through 15C further illustrate components of a system that may include an HMD that may implement recording indicator technology, according to some embodiments.

Embodiments of an HMD 1200 as illustrated in FIG. 12 may, for example, be used in augmented or mixed (AR) applications to provide augmented or mixed reality views to the user. HMD 1200 may include one or more sensors, for example located on external surfaces of the HMD 1200, that collect information about the user's external environment (video, depth information, lighting information, etc.); the sensors may provide the collected information to controller 1260 of the CGR system. The sensors may include one or more visible light cameras 1250 (e.g., RGB video cameras) that capture video of the user's environment that may be used to provide the user with a virtual view of their real environment. In some embodiments, video streams of the real environment captured by the visible light cameras 1250 may be processed by the controller 1260 of the HMD 1200 to render augmented or mixed reality frames that include virtual content overlaid on the view of the real environment, and the rendered frames may be provided to display 1210.

The HMD 1200 may include recording functionality that allows the user to record images or video of the real environment captured by the HMD camera(s) 1250, for example by storing the video to memory 1270 or alternatively by streaming the video to a remote device for storage via a wired or wireless connection. Various embodiments of recording indicators for HMDs 1200 that provide protection from tampering so that the recording indicators cannot be easily disabled or masked are described. Note that the camera(s) 1250 may operate to capture frames for processing by the HMD controller 1260 while not recording video, in which case the recording indicator 258 may be disabled.

Embodiments of recording indicators that are integrated in an HMD camera 1200 and that emit visible light through the camera lens aperture are described with respect to FIGS. 2A through 8.

Modular Recording Indicator Solutions

Embodiments of modular solutions for providing indications that a user may be recording with a camera in an HMD are described. Note, however, that these modular solutions may also be applied in mobile, handheld devices as illustrated in FIG. 1, as well as in other devices that include camera(s).

Figure 13:
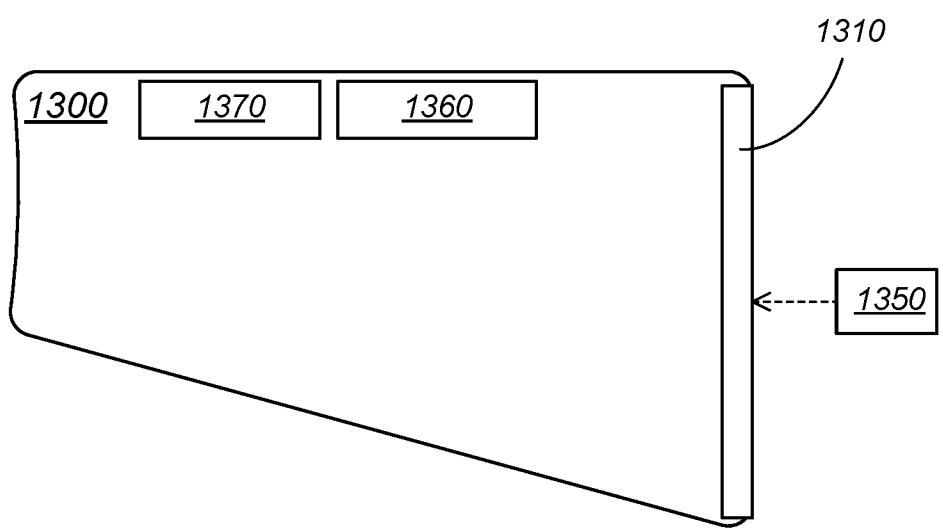
FIG. 13 illustrates a modular camera accessory for an HMD, according to some embodiments.

FIG. 13 illustrates a modular camera accessory for an HMD, according to some embodiments. An HMD 1300 may include, but is not limited to, a frame, a display 1310, a controller 1360, and memory 1370. In some embodiments, a modular accessory 1350 that contains the entire recording functionality (e.g., a video camera, one or more processors for processing video frames, and memory for storing captured video) for an HMD 1300 may be provided. To record video with the HMD 1300 and accessory 1350, the user has to attach the accessory 1350 to the HMD 1300 frame. The presence of the modular accessory 1350 on the HMD 1300 would thus serve to indicate to persons in the environment that they may be being recorded. This would also have the added effect of making the HMD 1300 frame (without the accessory 1350) lighter, which would benefit users who do not need to record, or who have no interest in recording functionality. The modular accessory 1350 would also make it possible for venues such as bars and theaters to ban the modular accessory 1350 while still allowing the HMD 1300 frame (without the accessory 1350) into the venues.

The modular accessory 1350 may attach to the HMD 1300 frame via a magnetic or mechanical connection. The modular accessory 1350 may communicate with the HMD 1300 controller 1360 via electrical contacts or via a wireless connection. The modular accessory 1350 has to be coupled to the HMD 1300 and in communication with the controller 1360 to enable recording of video captured by the modular accessory 1350. In some embodiments, the modular accessory 1350 may include a power source (e.g., a battery). In some embodiments, the modular accessory 1350 may include one or more processors (e.g., an ISP coupled to the camera's image sensor). In various embodiments, the user may control the accessory 1350 via one or more of physical buttons on the HMD 1300 and/or on the accessory 1350, voice commands, or gestures.

In some embodiments, the modular accessory 1350 may enable recording video to the HMD memory 1370. In some embodiments, the modular accessory 1350 may include memory for recording video. Instead or in addition, the modular accessory 1350 may include wired or wireless communication technology to transmit the video to a smartphone or other external device for recording. In some embodiments, accessory 1350 may include smart authentication technology so that each accessory 1350 is uniquely paired to a particular HMD 1300. Smart authentication may, for example, deter theft and reduce risk through accidental 'swapping' of accessories 1350.

FIG. 14 illustrates a modular accessory 1490 for an HMD 1400 that acts as a "key" to enable recording functionality for the HMD camera(s) 1450, according to some embodiments. In these embodiments, a modular accessory 1490 may be provided that the user has to attach to the HMD 1400 to enable recording with an integrated camera 1450. The presence of the modular accessory 1490 on the HMD 1400 would thus serve to indicate to persons in the environment that they may be being recorded. The modular accessory 1490 would also make it possible for venues such as bars and theaters to ban the modular accessory 1490 while still allowing the HMD 1400 frame (without the accessory 1490) into the venues.

The modular accessory 1490 may attach to the HMD 1300 frame via a magnetic or mechanical connection. The modular accessory 1490 may communicate with the HMD 1400 controller 1460 via electrical contacts or via a wireless connection. In some embodiments, the modular accessory 1490 may enable recording video captured by the integrated camera 1450 to the HMD memory 1470; without the accessory, 1490, video cannot be recorded. In some embodiments, the modular accessory 1490 may include memory for recording video captured by the integrated camera 1450; without the accessory, 1490, video cannot be recorded. Instead or in addition, the modular accessory 1490 may include wired or wireless communication technology to transmit the video to a smartphone or other external device for recording. In some embodiments, accessory 1490 may include smart authentication so that each accessory 1490 is uniquely paired to a particular HMD 1400. Smart authentication may, for example, deter theft and reduce risk through accidental 'swapping' of accessories 1490.

Note that internal or external visible light recording indicators as described above in reference to FIGS. 2 through 11 may be used in combination with either of the modular solutions as illustrated in FIGS. 13 and 14. However, in both embodiments, the presence of the modular attachment may serve to indicate to persons in the environment that they may be being recorded.

FIGS. 15A through 15C are block diagrams illustrating example systems that may include components and implement methods for providing recording indicators as illustrated in FIGS. 2 through 11 in devices including handheld devices and HMDs, according to some embodiments. Note that while these examples are directed to recording indicators for cameras in HMDs, similar recording indicator methods may be applied to other devices including but not limited to mobile, handheld devices as illustrated in FIG. 1.

FIG. 15A is a block diagram illustrating an example system that may include recording indicator components and methods as illustrated in FIGS. 2A through 11, according to some embodiments. In some embodiments, a system may include an HMD 2000 such as a headset, helmet, goggles, or glasses. HMD 2000 may implement any of various types of display technologies. For example, HMD 2000 may include a near-eye display system that displays left and right images on opaque display screens 2022A and 2022B in front of the user's eyes that are viewed by the user. As another example, rather than an opaque display, an HMD may include transparent or translucent displays 2022A and 2022B (e.g., eyeglass lenses) through which the user may view the real environment and a medium integrated with displays 2022A and 2022B through which light representative of virtual images is directed to the user's eyes to provide an augmented view of reality to the user.

In some embodiments, HMD 2000 may include a controller 2030 configured to implement functionality of the system and to generate frames (each frame including a left and right image) that are provided to displays 2022A and 2022B. In some embodiments, HMD 2000 may also include memory 2032 configured to store software (code 2034) of the system that is executable by the controller 2030, as well as data 2038 that may be used by the system when executing on the controller 2030. In some embodiments, memory 2032 may also be used to store video captured by camera 2050. In some embodiments, HMD 2000 may also include one or more interfaces (e.g., a Bluetooth technology interface, USB interface, etc.) configured to communicate with an external device 2090 via a wired or wireless connection. In some embodiments, at least a part of the functionality described for the controller 2030 may be implemented by the external device 2090. External device 2090 may be or may include any type of computing system or computing device, such as a desktop computer, notebook or laptop computer, pad or tablet device, smartphone, hand-held computing device, game controller, game system, and so on.

In various embodiments, controller 2030 may be a uniprocessor system including one processor, or a multiprocessor system including several processors (e.g., two, four, eight, or another suitable number). Controller 2030 may include central processing units (CPUs) configured to implement any suitable instruction set architecture, and may be configured to execute instructions defined in that instruction set architecture. For example, in various embodiments controller 2030 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2030 may employ any microarchitecture, including scalar, superscalar, pipelined, superpipelined, out of order, in order, speculative, non-speculative, etc., or combinations thereof. Controller 2030 may include circuitry to implement microcoding techniques. Controller 2030 may include one or more processing cores each configured to execute instructions. Controller 2030 may include one or more levels of caches, which may employ any size and any configuration (set associative, direct mapped, etc.). In some embodiments, controller 2030 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2030 may include one or more other components for processing and rendering video and/or images, for example image signal processors (ISPs), coder/decoders (codecs), etc.

Memory 2032 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 2000 may include one or more sensors (not shown) that collect information about the user's environment (video, depth information, lighting information, etc.). The sensors may provide the information to the controller 2030 of the system. In some embodiments, the sensors may include, but are not limited to, at least one visible light camera 2050 (e.g., an RGB video camera) and ambient light sensors.

In some embodiments, the HMD 2000 may be configured to render and display frames to provide an augmented or mixed reality (MR) view for the user based at least in part according to sensor inputs. The MR view may include renderings of the user's environment, including renderings of real objects in the user's environment, based on video captured by one or more video cameras 2050 that capture high-quality, high-resolution video of the user's environment for display. The MR view may also include virtual content (e.g., virtual objects, virtual tags for real objects, avatars of the user, etc.) generated by the system and composited with the displayed view of the user's real environment.

The HMD 2000 may include recording functionality that allows the user to record images or video of the real environment captured by the HMD camera(s) 2050. The HMD 2000 may include a recording indicator 2058 that is integrated in camera 2050 and that emits visible light through the camera lens aperture or through the camera objective lens so that the recording indicator covers the field of view of the camera, for example as illustrated in FIGS. 2A through 8. Alternatively, the HMD 2000 may include a recording indicator 2058 as illustrated in FIGS. 9A, 9B, and 10, or a recording indicator 2058 that includes a prism located in front of the camera lens as illustrated in FIG. 11.

FIG. 15B is a block diagram illustrating an example system that may include recording indicator components and methods as illustrated in FIG. 13, according to some embodiments. In these embodiments, the HMD 2000 includes a camera receiver 2051 via which a camera accessory 2050 module as described in reference to FIG. 13 physically or magnetically attaches to the HMD 2000. The modular accessory 2050 contains the entire recording functionality for HMD 2000. To record video, the user has to attach the accessory 2050 to the HMD 2000 frame. The presence of the modular accessory 2050 on the HMD 2000 would thus serve to indicate to persons in the environment that they may be being recorded.

FIG. 15C is a block diagram illustrating an example system that may include recording indicator components and methods as illustrated in FIG. 14, according to some embodiments. In these embodiments, the HMD 2000 includes a key receiver 2081 via which a key accessory 2080 module as described in reference to FIG. 14 physically or magnetically attaches to the HMD 2000. The user has to attach accessory 2080 to the HMD 2000 to enable recording with an integrated camera 2050. The presence of the modular accessory 2080 on the HMD 2000 would thus serve to indicate to persons in the environment that they may be being recorded.

Note that internal or external visible light recording indicators as described above in reference to FIGS. 2 through 11 may be used in combination with either of the modular solutions as illustrated in FIGS. 15B and 15C.

Embodiments of the HMD 2000 as illustrated in FIGS. 15A through 15C may also be used in virtual reality (VR) applications to provide VR views to the user. In these embodiments, the controller 2030 of the HMD 2000 may render or obtain virtual reality (VR) frames that include virtual content, and the rendered frames may be displayed to provide a virtual reality (as opposed to mixed reality) experience to the user.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
   an image sensor; and
   a lens barrel comprising one or more refractive lens elements configured to refract light received from an object field to form an image at an image plane at a surface of the image sensor;
   an optical element positioned in front of the lens barrel; and
   one or more light sources;
   wherein the one or more light sources are configured to emit light to the optical element;
   wherein the optical element is configured to redirect the light emitted by the one or more light sources to illuminate at least a portion of the object field;
   wherein the optical element is a prism and the light emitted passes through the prism, wherein a first surface of the prism faces the object field, a third surface of the prism faces the lens barrel, wherein the one or more light sources are positioned at a second surface of the prism.

2. The camera as recited in claim 1, wherein the one or more light sources emit visible light when the camera is in recording mode and do not emit visible light when the camera is not in recording mode.

3. The camera as recited in claim 1, wherein the one or more light sources are configured to emit the light into the second surface of the prism, and wherein the light is redirected by the third surface of the prism through the first surface of the prism.

4. The camera as recited in claim 3, wherein the light is redirected by the third surface of the prism through the first surface of the prism via total internal reflection (TIR).

5. The camera as recited in claim 1, wherein the redirected light covers a field of view of the camera.

6. The camera as recited in claim 1, wherein the one or more light sources are activated to emit light in response to initiation of recording video captured by the camera.

7. The camera as recited in claim 1, wherein the one or more light sources are light-emitting diodes (LEDs).

8. The camera as recited in claim 1, wherein light from the object field passes through the optical element and into the lens barrel.

9. The camera as recited in claim 1, wherein the camera is a component of a mobile handheld device that includes memory for storing video frames captured by the camera when recording mode is enabled.

10. The camera as recited in claim 1, wherein the camera is a component of a head-mounted device (HMD) that includes memory for storing video frames captured by the camera when recording mode is enabled.

11. A method, comprising:
    emitting, by one or more light sources, light into an optical element positioned in front of a lens barrel of a camera, wherein the lens barrel includes one or more refractive lens elements that refract light received from an object field to form an image at an image plane at a surface of an image sensor of the camera; and
    redirecting, by the optical element, the light emitted by the one or more light sources to illuminate at least a portion of the object field, wherein the optical element is a prism and the light emitted passes through the prism, wherein a first surface of the prism faces the object field, a third surface of the prism faces the lens barrel.

12. The method as recited in claim 11, further comprising detecting when the camera is in record mode, wherein the one or more light sources emit visible light when the camera is in record mode and do not emit visible light when the camera is not in record mode.

13. The method as recited in claim 11, wherein the one or more light sources emit the light into a second surface of the prism; and
    wherein redirecting, by the optical element, the light emitted by the one or more light sources comprises redirecting the light via total internal reflection (TIR) off the third surface of the prism and through the first surface of the prism.

14. The method as recited in claim 11, wherein the redirected light covers a field of view of the camera.

15. The method as recited in claim 11, further comprising activating the one or more light sources to emit light in response to a user of a device initiating recording of video by the camera.

16. The method as recited in claim 11, wherein the one or more light sources are light-emitting diodes (LEDs).

17. The method as recited in claim 11, wherein light from the object field passes through a first surface and a third surface of the optical element and into the lens barrel.

18. A device, comprising:
    a camera configured to capture video, the camera comprising:
       an image sensor; and a lens barrel comprising one or more refractive lens elements configured to refract light received from an object field to form an image at an image plane at a surface of the image sensor;

an optical element positioned in front of the lens barrel; and a recording indicator comprising one or more light sources;

memory for recording video captured by the camera when a recording mode is enabled;

wherein the recording indicator is configured to emit light into the optical element when the recording mode is enabled; and wherein the optical element is configured to redirect the light emitted by the recording indicator towards the object field, wherein the redirected light is visible within a field of view of the camera when the recording mode is enabled, and wherein the optical element is a prism and the light emitted passes through the prism, wherein a first surface of the prism faces the object field, a third surface of the prism faces the lens barrel of the camera.

19. The device as recited in claim 18, wherein the recording indicator is configured to emit light into a second surface of the prism when the recording mode is enabled, and wherein, to redirect the light emitted by the recording indicator towards the object field, the third surface redirects the light via total internal reflection (TIR) through the first surface of the prism.

20. The device as recited in claim 18, wherein the device is one of a mobile handheld device and a head-mounted device (HMD).

* * * * *